Figure 1:
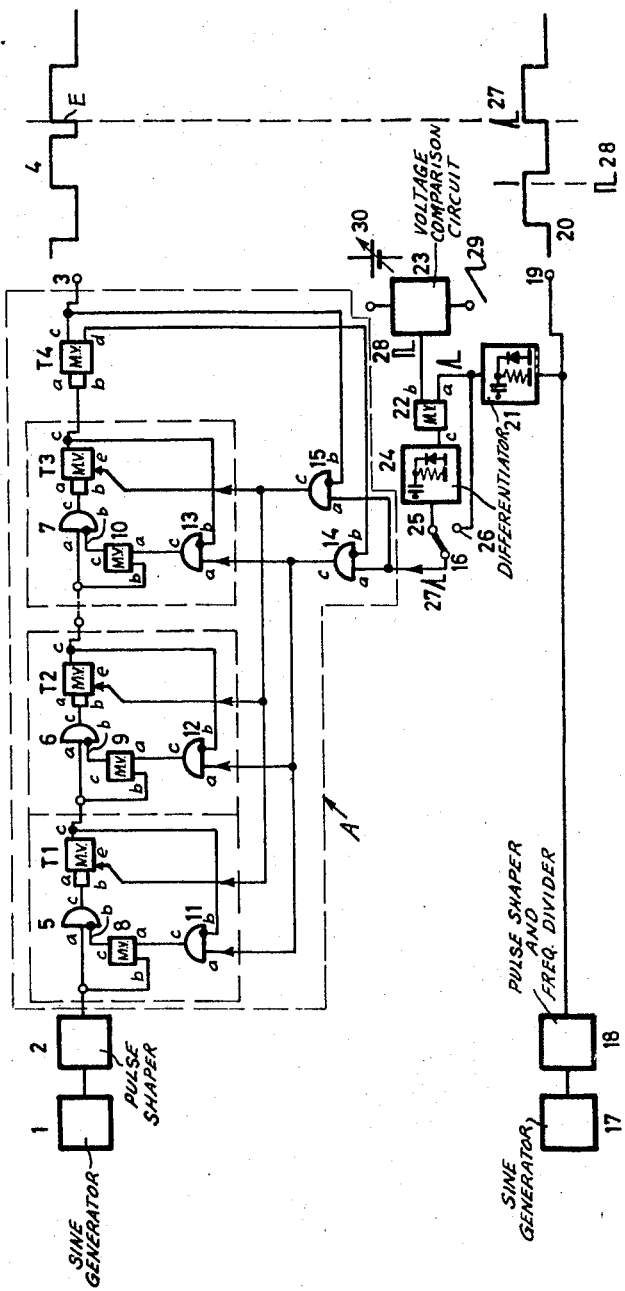

Dec. 20, 1966   F. WEISSKER   3,293,547
PHASE SYNCHRONIZATION OF ALTERNATING VOLTAGES
Filed Oct. 24, 1963   3 Sheets-Sheet 1

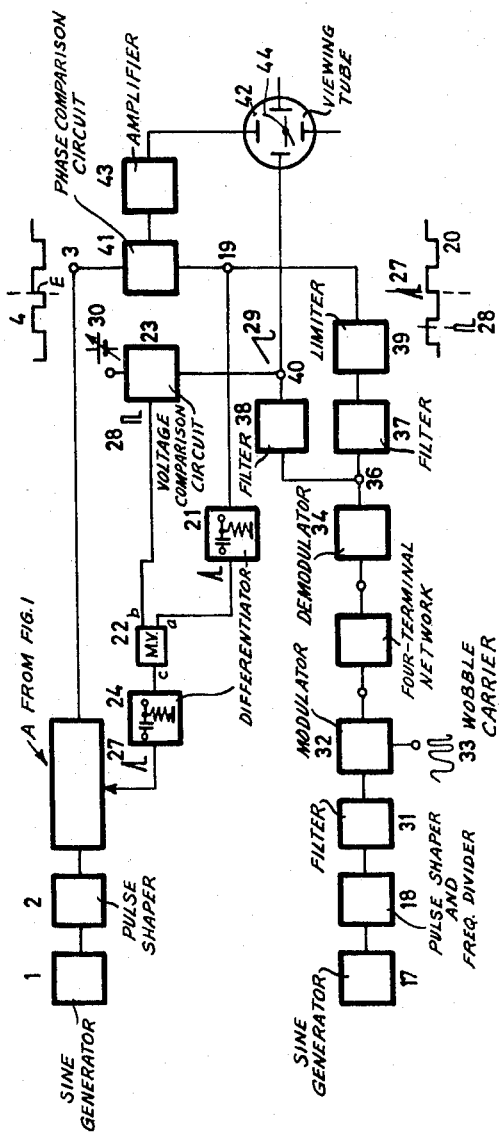

United States Patent Office 3,293,547
Patented Dec. 20, 1966

3,293,547
PHASE SYNCHRONIZATION OF ALTERNATING VOLTAGES
Frido Weissker, Grafelfing, Germany, assignor to Siemens & Halske Aktiengesellschaft, Berlin and Munich, Germany, a corporation of Germany
Filed Oct. 24, 1963, Ser. No. 318,543
Claims priority, application Germany, Oct. 29, 1962, S 82,228
8 Claims. (Cl. 324—57)

The invention disclosed herein is concerned with a circuit arrangement for the phase synchronization of two alternating voltages.

In the electrical communication and instrumentation and measurement arts, there frequently arises the problem of phase synchronizing two alternating voltages with each other, one of which is to be considered as a control voltage. Circuit arrangements are known for the solution of this problem, in which a phase comparison between the two voltages is effected, in the course of which a direct voltage is being produced which is dependent on the magnitude and direction of the phase difference, which direct voltage is used in known manner for appropriately correcting the output frequency of the generator which produces the one of these alternating voltages which is to be adjusted. This is brought about, for instance, by an adjustment, controlled by the direct voltage, of a variable tuning capacitor in the frequency-determining circuit of said generator. It is thereby generally impossible, for example, due to the limitation of the obtainable frequency change resulting from the limited pulling range of said generator, to obtain short synchronization times, particularly when alternating voltages of relatively low frequency are concerned, and otherwise when a maximum phase shift between the two alternating voltages of 180° happens to be present.

The object of the present invention is to obtain a phase synchronization of two alternating voltages, which is brought about directly and carried out by a setting command pulse, independently of the phase difference present at the time. Furthermore, the remaining phase difference between the two alternating voltages, which is still present after the phase synchronization has taken place, is to be less than a specific given value. Moreover, the maximum remaining phase difference still possible after synchronization has been effected, is to be easily determinable in value and shall not require either an adjustment or a resetting of any circuit characteristics.

The circuit arrangement in accordance with the invention, in which at least the alternating voltage which is to be adjusted in phase is with the aid of frequency-dividing means derived from a voltage of higher frequency, is characterized in that the frequency-dividing means are constructed as a series circuit of bistable multi-vibrators, in which within said series circuit, the first output of a multi-vibrator is operatively connected with the first and second parallel connected inputs of the subsequent multi-vibrator, the first output of the last multi-vibrator supplying the first alternating voltage to be adjusted in phase, and a gate whose output is connected with the third inputs of said bistable multi-vibrators other than that of the last in such series circuit and whose second input is operatively connected with an output of said last multi-vibrator in such series circuit, means for the generation of a second alternating voltage and for the derivation therefrom of a second square wave voltage of a frequency greater than that of said first square voltage, means for deriving a setting command pulse from said second square voltage, and means for supplying such setting command pulse to the first input of said gate.

In accordance with another feature of the invention, the controlling alternating voltage is a phase-modulated and particularly a periodically phase-modulated voltage which serves for the transmission of data, for example measuring data, a setting command pulse being derived from this phase-modulated voltage at a predetermined time and particularly periodically at the same time within each modulation period.

The circuit arrangement in accordance with the invention is used to particular advantage for synchronizing in phase the demodulated signal modulating voltage on the receiver side, of a low-frequency modulated carrier oscillation serving, in accordance with the known Nyquist method, for the envelope-delay measurement of a four-terminal network, with a low-frequency comparison voltage produced on the receiving side, the setting command pulse being derived from the signal modulating voltage at an adjustable given value of the carrier frequency.

Further features and advantages of the circuit arrangement in accordance with the invention will appear from the appended claims and from the description presented below with reference to the accompanying drawings.

Figure 2:
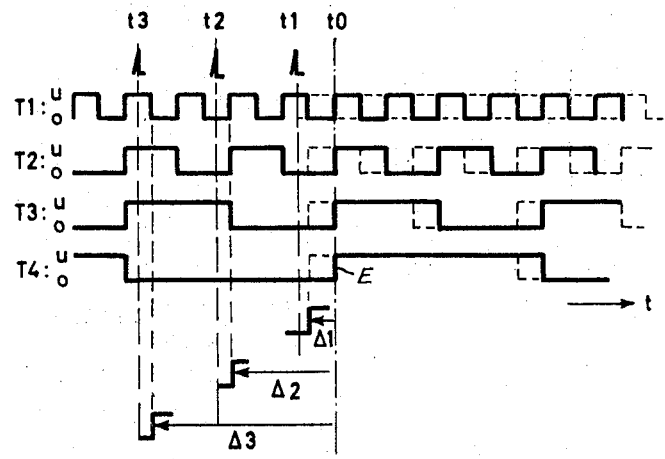
Figure 3:
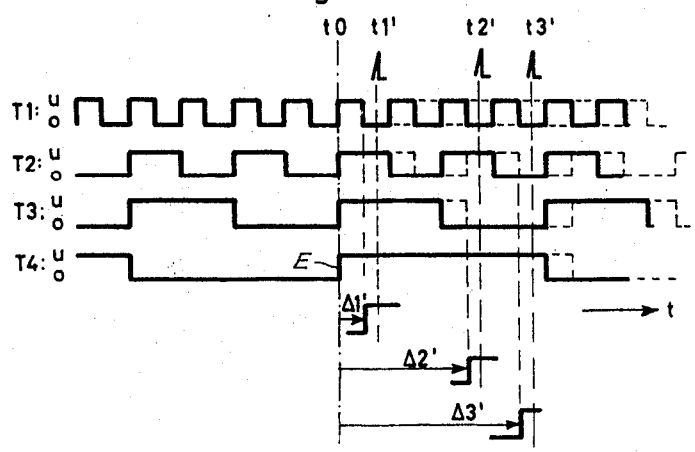

FIG. 1 shows a preferred embodiment of the circuit arrangement in accordance with the invention;

FIGS. 2 and 3 are time diagrams of the voltages occurring at the output terminals of the individual binary divider stages; and FIG. 4 shows a preferred example of the intermittent phase synchronization of the demodulated low frequency signal modulating voltage of a carrier oscillation, which is frequency modulated with said signal modulating voltage, serving for envelope-delay measurement of a four terminal network according to the known Nyquist method, with a comparison voltage.

In the example shown in FIG. 1, the alternating voltage which is to be adjusted in phase is produced by a sine generator 1 and extended to a pulse shaper 2 which changes the generator output voltage into a square wave voltage, the single positive pulses of which being called counting pulses hereinafter. Adjoining the pulse shaper 2 are binary divider stages T1, T2, T3 and T4 which are constructed as bistable flip-flop circuits and in each case reduce by one-half the frequency of the counting pulses fed to the input terminals $a$ thereof. The square wave voltage designated 4 appears at the output terminal 3. Ahead of the respective binary divider stages, with the exception of the last stage T4, are gate circuits 5, 6 and 7, respectively, which can be blocked for the counting pulses within specific time intervals. In the circuit arrangement shown, these gate circuits are selected as EXCEPT gates having a first input terminal $a$, a second input terminal $b$ and an output terminal $c$, and being of the type which allows the production of an output pulse from input pulses only if a first input pulse at $a$ is present and a second input pulse at $b$ is absent. To the first input terminal $a$ of the first EXCEPT gate there is fed the counting pulses of the pulse shaper 2 while a control voltage which effects the blocking of the gate is fed to second input terminal $b$. The EXCEPT gate output terminals $c$ are connected with the corresponding input terminals $a$ and $b$ of the associated divider stages T1, T2 and T3. The said EXCEPT gates receive their blocking control voltage from the output terminals $c$ of associated bistable flip-flop circuits 8, 9 and 10, the input terminals $b$ of which are connected with the first input terminals $a$ of the EXCEPT gates, respectively, while the input terminals $a$ are connected to the output terminals $c$ of EXCEPT gates 11, 12, 13. The latter EXCEPT gates, which are of the same type as the gates 5, 6 and 7, can be blocked by means of the voltages which are supplied to them through their control input terminals $b$ and have been derived from the output terminals $c$ of the associated divider stages T1, T2 and T3, while their other input terminals $a$ are connected in common to the output terminals c of an EXCEPT gate 14. Furthermore, similar input terminals e of the respective binary divider stages T1, T2 and T3 are connected jointly to the output terminal c of an EXCEPT gate 15. The EXCEPT gates 14 and 15 are of the same type as the gates 5, 6 and 7. The control input terminals b of the EXCEPT gates 14 and 15 are connected with the two output terminals c and d of the divider stage T4, while the second input terminals a are connected jointly to a changeover switch 16.

The controlling alternating voltage is produced by a sine generator 17 and so shaped and reduced in frequency, by a pulse shaper and frequency divider 18, that a square wave voltage 20 having a frequency corresponding to the voltage 4 is present at the terminal 19. The terminal 19 is connected over a differentiating member 21 with the one input terminal a of a bistable flip-flop circuit 22, the other input terminal b of which is connected to a voltage comparison circuit 23. The output terminal c of the flip-flop stage 22 is connected over another differentiating member 24 with one contact 25 of the changeover switch 16, while the output of the differentiating member 21 is connected directly to a second contact 26 of the changeover switch.

In order to explain the manner of operation of the circuit shown in FIG. 1, reference is made to FIGS. 2 and 3 which give time diagrams of the voltages occurring at the output terminals c of the binary divider stages T1, T2, T3 and T4. The output voltages vary between two amplitude values which are designated by zero (reference potential) and by U. The output voltage of T4 corresponds to the voltage designated 4 in FIG. 1. The invention is now based on recognition of the fact that an additional change of state of the flip-flop stage T1 influences the different voltages and in particular also the output voltage of T4 in the sense of a shift in phase to the left (FIG. 2) by the length of half a cycle of the output voltage of T1. Upon considering the orientation of the time axis t, this phase shift means a lead in time by half a period of the output voltage of T1. The resultant voltage curves for such an additional change of state of the binary divider stage T1 at the time $t1$, are shown in FIG. 2 in dashed lines. One additional change of the state of divider stage T2 gives correspondingly a phase shift in the same direction of twice the amount, and a change of state of the divider stage T3 a phase shift by four times the amount. If the stated several divider stages are changed simultaneously, the sum of all the individual phase shifts is then obtained for the output voltage T4.

If, on the other hand, the divider stage T1 is blocked for a single counting pulse, so that its change of state is suppressed, then in accordance with FIG. 3, all the output voltages and in particular also the output voltage of T4 are influenced in the sense of a phase shift toward the right by one-half a cycle of the output voltage of T1. Corresponding to the orientation of the time axis t, this phase shift means a lag in time by one-half the period of the output voltage of T1. For such a blocking of the divider stage T1 which starts at the time $t1'$, the resultant phase-shifted voltage curves are shown in dashed line in FIG. 3. A corresponding blocking of the divider stage T2 for a single counting pulse, means a phase shift in the same direction by twice the amount, and a blocking of T3 a phase shift by four times the amount. If several divider stages are blocked, the sum of all individual phase shifts is obtained in each case for the output voltage of T4.

Accordingly, it is possible, by an additional change of state of individual or several divider stages simultaneously to obtain a phase shift of the output voltage of T4 by one, two or four unit steps or any desired sum thereof in the direction of a phase lead, the unit step corresponding to the half period of the output voltage of T1. For the blocking of individual or several divider stages simultaneously, analogous phase shifts of the output voltage result in the sense of a phase lag. If the leading edge of a counting pulse occurring at the time $t0$ of the uninfluenced output voltage of T4 is taken as reference edge, an approximate phase setting of this reference edge to a setting command pulse displaced in time can be obtained by the changing or blocking measures described. If, for instance, a setting command pulse occurs at the time $t1$ (FIG. 2), then an additional switching of T1 results in a shift of the reference edge by $\Delta 1$ (one unit step). Upon the occurrence of a setting command pulse at the time $t2$, an additional changing of the divider stage T3 effects a shift by $\Delta 2$ (four unit steps). In order to get the reference edge E to a setting command pulse occurring at the time $t3$, a switching of the divider stages T1, T2 and T3 is effected, thereby effecting a shift by $\Delta 3$ (seven unit steps). In the case of a time lag of the setting command pulse as compared with the reference edge E, the latter can be adjusted approximately to it in phase by the blocking of individual or several divider stages. If a lagging setting command pulse occurs, for instance at the times $t1'$, $t2'$ or $t3'$ (FIG. 3), then there is a setting in phase of the reference edge in each case by blocking of the divider stage T1 (shift by $\Delta 1'$, one unit step), the divider stages T1 and T3 (shift by $\Delta 2'$, five unit steps) or of divider stages T1, T2 and T3 (shift by $\Delta 3'$, seven unit steps). Since the adjustment in phase described of the reference edge to a setting command pulse which is shifted in time takes place in each case only in integral unit steps, a phase difference remains after the setting has been effected, which difference, however, is not greater than one unit step, that is, one-half the period of the output voltage of the first divider stage T1.

In the circuit shown in FIG. 1, one or more setting command pulses 27, to which a reference edge E of the voltage 4 is to be adjusted in phase, are derived from the voltage 20 by means of the differentiating circuit 21 indicated in FIG. 1, has the effect that there are extended only positive pulses which coincide in time with the leading edge of the individual positive pulses of the voltage 20. If the contact 26 is closed by the switch 16, setting command pulses 27 will be derived from the leading edges of all positive pulses of the voltage 20. On the other hand, if the contact 25 is closed, only a single pulse from the series of pulses derived over the differentiating member is extended as setting command pulse 27. In the latter case, a command pulse 28 which is fed to the input terminal b of the bistable flip-flop circuit 22, flipping it out of its rest position, causes the next following pulse derived over the differentiating member 21 to flip the flip-flop circuit 22 back again, whereby a positive pulse is extended as a single setting command pulse 27, over the differentiating member 24. The command pulse 28 can, for instance, also consist of an output pulse of the voltage comparison circuit 23, which pulse is formed in case of identity of amplitude of a triangular voltage 29 fed to one input and a direct voltage 30 of adjustable value fed to the other input. In case there is provided a periodic triangular voltage 29, there are obtained a series of command pulses 28 which produce periodic setting command pulses 27 having a period determined by the value of the direct voltage 30.

Each setting command pulse 27 is now fed as a function of its displacement in time with respect to a reference edge E of the voltage 4, to those binary divider stages which on the one hand by changing measures or on the other hand by blocking measures, effect in each case a shift in phase of the reference edge E upon this setting command pulse 27. The changing or blocking of the individual divider stages is effected by the setting command pulse 27 itself, while the selection of the divider stages to be influenced in each case, which selection is dependent on the value of the shift in time of the setting command pulse with respect to the reference edge, as well as the nature of the influence (changing or blocking) which is dependent upon the direction of the shift (lead or lag), is established in the embodiment shown in FIG. 1 in the following manner:

The type of influencing is by means of the EXCEPT gates 14 and 15 selected as a function of the direction of the time displacement between the setting command pulse and the reference edge E. This is done by controlling both EXCEPT gates in opposite sense from output terminals $c$, $d$ of the divider stage T4, respectively. As a comparison with FIGS. 2 and 3 shows, a voltage value of zero occurs at the output terminal $c$, in the half cycle of the output voltage of T4 which lies in front of the reference edge E and defines the lead, so that there is no blocking voltage at the control input terminal $b$ of the EXCEPT gate 15. The other output terminal $d$ of the divider stage T4 supplies at the same time an output voltage, so that the control input terminal $b$ of 14 is under the influence of a blocking voltage. Thus, within the lead characterizing half cycle of the output voltage T4, the EXCEPT gate 15 is opened, while the EXCEPT gate 14 is blocked. The lag defining half cycle is subject to the reverse conditions. At the output terminal $c$ of the except gate 15 there thus occur merely setting command pulses 27 which lead in time, while at the output terminal $c$ of the EXCEPT gate 14 there occur merely setting command pulses 27 which lag in time. The selection from among the individual divider stages T1, T2 and T3, for obtaining the desired phase shift is now so effected that at the occurrence of a leading setting command pulse 27 these divider stages, which at the time ($t1$, $t2$ or $t3$) of the occurrence of the setting command pulse supply an output voltage U (FIG. 2) to their output terminals $c$, are additionally changed in their state. In FIG. 1, therefore, the leading setting command pulses 27 can be fed jointly to the input terminals $e$ of the individual divider stages T1, T2 and T3, since there is in this way automatically effected in each case only one changing of those divider stages which are just giving off a voltage U at their output terminals $c$, so that this voltage U is switched off as a result of the changing action. In the case of a lagging setting command pulse, the same divider stages, as a function of the magnitude of the time shift of the setting command pulse, must be blocked for a single one of the counting pulses supplied to their input terminals $a$ and $b$. This is appropriately effected by causing the lagging setting command pulses to travel over EXCEPT gates 11, 12 and 13, as will be described hereinafter. Upon considering instead of a leading setting command pulse, a lagging setting command pulse (FIG. 3) having the same phase difference with respect to the reference edge E, it will be seen that the voltage conditions at the output terminals $c$ of the divider stages T1, T2, T3 and T4 are reversed. Those divider stages which in case of a leading setting command pulse give off an output voltage U at their output terminals $c$, have the output voltage reduced to zero upon the occurrence of a lagging setting command pulse of corresponding phase shift. If, therefore, the same divider stages are to be blocked for a single counting pulse upon a lagging of the setting command pulse, then the EXCEPT gates 11, 12 or 13 to be traversed by the setting command pulses, must be opened when the output voltage at the terminal $c$ of the associated divider stage amounts to zero. This result is advantageously obtained by feeding the output voltage of the terminal $c$ of the corresponding divider stage as a control voltage to the blocking input terminal $c$ of the corresponding associated EXCEPT gates 11, 12 or 13. The EXCEPT gates 11, 12 or 13 of those divider stages T1, T2 or T3 which are changed in state by leading setting command pulses as a function of the shift in time, are in this way opened for a lagging setting command pulse of the same phase shift. The setting command pulses extended over the EXCEPT gates 11, 12 or 13 are then fed to the input terminals $a$ of the bistable flip-flop circuits 8, 9 or 10, and effect a flipping from the normal position in which there is no output voltage supplied to the output terminal $c$ into the position in which an output voltage is given off to the blocking input terminal $b$ of the EXCEPT gates 5, 6 or 7. Upon the occurrence of these output voltages, the latter EXCEPT gates are automatically blocked until the next counting pulse which switches the flip-flop circuits 8, 9 or 10 again into the normal position, which again cuts off the output voltage at $c$. The blocking of the EXCEPT gates 5, 6 or 7 continues accordingly from the occurrence of a lagging setting command pulse until the occurrence of the next following counting pulse, this counting pulse being not yet transferred over the blocked EXCEPT gates 5, 6 or 7.

As a result of the above described influencing of the individual divider stages T1, T2 and T3, the reference edge E of the voltage 4 which is to be adjusted is phase-shifted into a position, where it nearly coincides with a setting command pulse 27, such adjustment being exact but for a remaining error which is determined by half the period of the output voltage of the first divider stage T1. Upon providing further divider stages in addition to the divider stages shown, the remaining error in the setting will be with increasing number of divider stages smaller in ratio to the period of the output voltage of the entire chain of binary dividers. If, for instance, $n$ divider stages are provided, then the remaining error is less than $$\frac{1}{2^n} \cdot t_a$$

when $t_a$ is the period of the output voltage of the last divider stage.

As a variant of the circuit arrangement shown in FIG. 1, it is of course also possible to replace the EXCEPT gates shown by AND gates, for instance, by connecting their control input terminals $b$ not to the output terminlas $c$ of the associated bistable flip-flop circuits but to the other output terminals not shown in FIG. 1, which supply an output voltage, when the output voltages of said output terminals $c$ are switched off, and vice versa, such AND gates being opened only if a control voltage is present at the control input $b$.

In the event that the frequency of the sine generator 1, and thus the repetition or sequence frequency of the alternating voltage 4 to be set, is selected smaller than the frequency of the sine generator 17, and thus the frequency of the controlling alternating voltage 20, the blocking of the divider stages can be dispensed with since only a leading of the setting command pulses 27 is possible. In this case, the circuit units designated by 5 to 14 in FIG. 1 are eliminated.

FIG. 4 shows a preferred embodiment of the circuit arrangement in accordance with the invention. Circuit units which correspond in construction and operation to units appearing in FIG. 1 are identically referenced. The contact 26 of FIG. 1 is omitted since the switch 16 is of importance only when the contact 25 is closed. The controlling alternating voltage 20 produced by the sine generator 17 and obtained over a pulse shaper and frequency divider 18 in the form of a square wave voltage, is used in this example to measure the envelope delay of a four-terminal network X according to the known Nyquist method. For this purpose, the sinusoidal fundamental oscillation of the square wave, given off by 18, is filtered out preferably by means of a low-pass filter 31 and fed as signal voltage to an input of a modulator 32, the other input of which is supplied with a frequency variable carrier oscillation 33. This carrier oscillaton s subjected to a continuous periodic change in frequency, i.e., wobbled, within a frequency range determined for the testing of said four-terminal network X. The modulated carrier oscillation appearing at the output of the modulator 32, is demodulated in a demodulator 34, after passing through the four-terminal network X, so that both the demodulated signal voltage and the wobble voltage effecting the frequency variation of the carrier oscillation 33 appear at the output terminals 36. The demodulated signal voltage is filtered out now by means of a high-pass filter 37 and the wobble voltage by means of a low-pass filter 38. To the output of the high-pass filter 37 is connected an amplitude limiter 39 which changes the demodulated sinusoidal signal voltage again into a square wave voltage 20 which lies, as controlling voltage, on the terminal 19 in accordance with FIG. 1. The wobble voltage screened out by the low-pass filter 38 appears at the terminal 40 as periodic sawtooth voltage 29 and is fed to one input of the voltage comparator circuit 23.

Depending on the amplitude of the direct voltage 30 which has been set, there are produced upon identical amplitudes of the voltages 30 and 29, command pulses 28 which effect the driving of a setting command pulse 27 from the series of pulses derived over differentiating member 21 in the manner which has been described in connection with FIG. 1. The position in time of these setting command pulses 27 within the period of the sawtooth voltage 29, is thereby determined by the established amplitude of the direct voltage 30. The sawtooth voltage 29 determnies, by the instantaneous value of its amplitude, a specific instantaneous value of the frequency of the carrier oscillation 33, and the forming of the command pulses 28 and thus also the deriving of the setting command pulses 27, accordingly takes place at a fixed frequency of the carrier oscillation 33 established by the amplitude of the adjustable direct voltage. As indicated in FIG. 4, upon the appearance of a setting command pulse 27, there takes place a phase adjustment of the reference edge E of the voltage 4 on this setting command pulse, which coincides in time with the leading edge of a positive pulse of the voltage 20, the said setting command pulse 27 being supplied to a box A containing the same elements as in FIG. 1.

It should be noted in this connection that the square wave voltage 20, which is in this embodiment produced by shaping from the demodulated signal voltage occurring at the output 36, contains a phase modulation which occurs, due to the envelope delay properties of the four-terminal network X as a function of the corresponding instantaneous value of the carrier frequency of the wobbled carrier oscillation 33. Upon deriving now, a given amplitude of the voltage 29 and thus at a fixed given value of the carrier frequency, a setting command pulse, there is upon each occurrence of a fixed predetermined frequency of the carrier oscillation 33 effected a periodic phase synchronization of the voltage 4 to be adjusted to the controlling voltage 20, which in itself is phase modulated.

There is in this way created, for the phase modulated voltage 20 to be evaluated, a periodically synchronized comparison voltage 4 which can be subjected, together therewith, to a phase comparison according to the Nyquist method in which a direct voltage is formed which is dependent on the phase difference of the two voltages 4 and 20 and evaluates the phase modulation of the voltage 20. This takes place in the phase comparison circuit 41, the inputs of which are connected to the terminals 3 and 19. The comparison voltage 4 is synchronized once in each period of the sawtooth voltage 29 or once in each modulation period of the voltage 20 in phase with the latter, so that a given reference value is established for the direct voltage evaluating the phase differences of the two voltages and occurring at the output of the phase comparison circuit 41. The frequency of the generator 1 is appropriately maintained constant by as far reaching a stabilization as possible, for instance, by the use of a quartz control, so that no undesired phase shifts of the comparison voltage 4 can occur which would falsify the phase comparison of the voltages 20 and 4. In order to exclude further undesired phase modulations of the voltage 20, it is also advantageous to stabilize the output frequency of the generator 17.

For the indication of the phase difference between the voltages 20 and 4, there is advantageously used a cathode ray tube 42, to one deflection system of which is fed the output voltage of the phase comparison circuit 41, after passage through an amplifier 43, while its other deflection system is supplied with the sawtooth voltage 29. The phase difference between the voltage 20 and the comparison voltage 4 constitutes thereby a measure for the envelope delay of the four-terminal network X as a function of the frequency of the carrier oscillation 33. The curve 44, described on the picture screen of the cathode ray tube 42, thus gives the envelope delay characteristic of the four-terminal network X within the frequency range established by the frequency variation of the carrier oscillation 33.

Changes may be made within the scope and spirit of the appended claims which define what is believed to be new and desired to have protected by Letters Patent.

I claim:
1. A circuit arrangement for the synchronizing of the phase of a first and of a second alternating voltage, comprising means for the generation of a first alternating voltage, means for the transformation of said first alternating voltage into a first square-wave voltage, a series circuit of bistable multivibrators, the output of said transformation means being connected to the input of the first multivibrator of said series circuit in which within said series circuit, the first output of a multivibrator is operatively connected with the first and second parallel-connected inputs of the subsequent multivibrator, the first output of the last multivibrator supplying the first alternating voltage to be adjusted in phase, a gate whose output is connected with the third inputs of said bistable multivibrators other than that of the last in such series circuit and whose second input is operatively connected with an output of said last multivibrator in such series circuit, means for the generation of a second alternating voltage and for the derivation therefrom of a second square-wave voltage of a frequency greater than that of said first square-wave voltage, means for deriving a setting command pulse from said second square-wave voltage, and means for supplying such setting command pulse to the first input of said gate.

2. A circuit arrangement according to claim 1, comprising in further combination, means for filtering out the sine-shaped basic wave from said second alternating voltage, operatively connected at the output of said means for the derivation of said second square-wave voltage, means operatively connected to said filtering means for modulating a wobbled carrier oscillation with said sine-shaped basic wave, means for demodulating said carrier oscillation, means for operatively connecting a four-terminal network between the output of said modulating means and the input of said demodulating means, filter means operatively connected to the output of said demodulator for obtaining said sine-shaped basic wave, limiting means operatively connected to the output of the last-mentioned filter means for deriving a square-wave voltage from the sine-shaped basic wave, phase-comparing means operatively connected to the output of the last multivibrator and to the output of said limiting means for effecting a phase comparison between the square-wave voltage occurring at the output of said limiting means and said first square-wave voltage, and means for the evaluation of the direct current at the output of the phase-comparing means.

3. A circuit arrangement for the synchronizing of the phase of a first and of a second alternating voltage, comprising means for the generation of a first alternating voltage, means for the transformation of said first alternating voltage into a first square-wave voltage, a series circuit of bistable multivibrators, the output of said transformation means being connected to the input of the first multivibrator of said series circuit in which within said series circuit, the first output of a multivibrator is operatively connected with the first and second parallel-connected inputs of the subsequent multivibrator, the first output of the last multivibrator supplying the first alternating voltage to be adjusted in phase, an EXCEPT-gate whose output is connected with the third inputs of said bistable multivibrators other than that of the last in such series circuit and whose second input is operatively connected with the first output of said last multivibrator in such series circuit, means for the generation of a second alternating voltage and for the derivation therefrom of a second square-wave voltage of a frequency greater than that of said first square-wave voltage, means for deriving a setting command pulse from said second square-wave voltage, and means for supplying such setting command pulse to the first input of said EXCEPT-gate.

4. A circuit arrangement for the synchronizing of the phase of a first and of a second alternating voltage, comprising means for the generation of a first alternating voltage, means for the transformation of said first alternating voltage into a first square-wave voltage, a series circuit of bistable multivibrators, the output of said transformation means being connected to the input of the first multivibrator of said series circuit in which within said series circuit, the first output of a multivibrator is operatively connected with the first and second parallel-connected inputs of the subsequent multivibrator, the first output of the last multivibrator supplying the first alternating voltage to be adjusted in phase, a AND-gate whose output is connected with the third inputs of said bistable multivibrators other than that of the last in such series circuit and whose second input is operatively connected with the second output of said last multivibrator in such series circuit, means for the generation of a second alternating voltage and for the derivation therefrom of a second square-wave voltage of a frequency greater than that of said first square-wave voltage, means for deriving a setting command pulse from said second square-wave voltage, and means for supplying such setting command pulse to the first input of said AND-gate.

5. A circuit arrangement for the synchronizing of the phase of a first and of a second alternating voltage, comprising means for the generation of a first alternating voltage, means for the transformation of said first alternating voltage into a first square-wave voltage, a first series circuit of gates and bistable multivibrators in alternating sequence which is terminated by another, following bistable multivibrator connected therewith, in which first series circuit the outputs of the gates are, in each case, connected with the first and second parallel-connected inputs of the immediately following multivibrators, and the first outputs of the last-mentioned multivibrators are in each case connected with the first input of the immediately following gate, the first output of the last multivibrator of said first series circuit being connected with the parallel-connected inputs of said terminating multivibrators, the first output of which supplies the alternating voltage to be adjusted in phase, the output of said transformation means being connected with the first input of the first gate, further series circuits comprising, in each case, a gate and a bistable multivibrator which are allocated, in each case, to a combination of a gate and a bistable multivibrator connected therewith of said first series circuit, the second input of the gates of said further series circuits being, in each case, operatively connected with an output of the corresponding multivibrator of said first series circuit, the output of said multivibrators of said further series circuits being connected, in each case, with the second input of the corresponding gate in said first series circuit, the first input of the multivibrators of the further series circuits being connected, in each case, with the output of the corersponding gate of the further series circuits, and the second input of the multivibrators of the further series circuits being connected, in each case with the first input of the corresponding gate of said first series circuit, two further gates, the output of the first being connected with the first inputs of the gates of said further series circuits, and the output of the second being connected with the third inputs of the bistable multivibrators of the first series circuit, and the second inputs of said two further gates being operatively connected with the respective two outputs of said further bistable multivibrator, means for providing a second alternating voltage and for the derivation therefrom of a second square-wave voltage of a frequency about equal to that of the first square-wave voltage, means for deriving a setting command pulse from the second square-wave voltage, and means for supplying said setting command pulse to the parallel-connected first inputs of said two further gates.

6. A circuit arrangement according to claim 5, comprising in further combination, means for filtering out the sine-shaped basic wave from said second alternating voltage, operatively connected at the output of said means for the derivation of said second square-wave voltage, means operatively connected to said filtering means for modulating a wobbled carrier oscillation with said sine-shaped basic wave, means for demodulating said carrier oscillation, means for operatively connecting a four-terminal network between the output of said modulating means and the input of said demodulating means, filter means operatively connected to the output of said demodulator for obtaining said sine-shaped basic wave, limiting means operatively connected to the output of the last mentioned filter means for deriving a square-wave voltage from the sine-shaped basic wave, phase-comparing means operatively connected to the output of the last multivibrator and to the output of said limiting means for effecting a phase comparison between the square-wave voltage occurring at the output of said limiting means and said first square-wave voltage, and means for the evaluation of the direct current at the output of the phase-comparing means.

7. A circuit arrangement for the synchronizing of the phase of a first and of a second alternating voltage, comprising means for the generation of a first alternating voltage, means for the transformation of said first alternating voltage into a first square-wave voltage, a first series circuit of EXCEPT-gates and bistable multivibrators in alternating sequence which is terminated by another, following bistable multivibrator connected therewith, in which first series circuit the outputs of the EXCEPT-gates are, in each case, connected with the first and second parallel-connected inputs of the immediately following multivibrator, and the first outputs of the last-mentioned multivibrators are in each case connected with the first input of the immediately following EXCEPT-gate, the first output of the last multivibrator of said first series circuit being connected with the parallel-connected inputs of said terminating multivibrator, the first output of which supplies the alternating voltage to be adjusted in phase, the output of said transformation means being connected with the first input of the first EXCEPT-gate, further series circuits comprising, in each case, an EXCEPT-gate and a bistable multivibrator which are allocated, in each case, to a combination of an EXCEPT-gate and a bistable multivibrator connected therewith of said first series circuit, the second input of the EXCEPT-gates of said further series circuits being, in each case, connected with the first output of the corresponding multivibrator of said first series circuit, the output of said multivibrators of said further series circuits being connected, in each case, with the second input of the corresponding EXCEPT-gate in said first series circuit, the first input of the multivibrators of the further series circuits being connected, in each case, with the output of the corresponding EXCEPT-gate of the further series circuits, and the second input of the multivibrators of the further series circuits being connected, in each case, with the first input of the corresponding EXCEPT-gate of said first series circuit, two further EXCEPT-gates, the output of the first being connected with the first inputs of the EXCEPT-gates of said further series circuits, and the output of the second being connected with the third inputs of the bistable multivibrators of the first series circuits, and the second inputs of said two further EXCEPT-gates being respectively connected with the two outputs of said further bistable multivibrator, means for producing a second alternating voltage and for the derivation therefrom of a second square-wave voltage of a frequency about equal to that of the first square-wave voltage, means for deriving a setting command pulse from the second square-wave voltage, and means for supplying said setting command pulse to the parallel connected first inputs of said two further EXCEPT-gates.

8. A circuit arrangement for the synchronizing of the phase of a first and of a second alternating voltage, comprising means for the generation of a first alternating voltage, means for the transformation of said first alternating voltage into a first square-wave voltage, a first series circuit of AND-gates and bistable multivibrators in alternating sequence which is terminated by another, following bistable multivibrator connected therewith, in which first series circuit the outputs of the AND-gates are, in each case, connected with the first and second parallel-connected inputs of the immediately following multivibrators, and the first outputs of the last mentioned multivibrators are in each case connected with the first input of the immediately following AND-gate, the first output of the last multivibrator of said first series circuit being connected with the parallel-connected inputs of said terminating multivibrators, the first output of which supplies the alternating voltage to be adjusted in phase, the output of said transformation means being connected with the first input of the first AND-gate, further series circuits comprising, in each case, an AND-gate and a bistable multivibrator which are allocated, in each case, to a combination of an AND-gate and a bistable multivibrator connected therewith of said first series circuit, the second input of the AND-gates of said further series circuits being, in each case, connected with the second output of the corresponding multivibrator of said first series circuit, the output of said multivibrators of said further series circuits being connected, in each case, with the second input of the corresponding AND-gate in said first series circuit, the first input of the multivibrators of the further series circuits being connected, in each case, with the output of the corresponding AND-gate of the further series circuits, and the second input of the multivibrators of the further series circuits being connected, in each case, with the first input of the corresponding AND-gate of said first series circuit, two further AND-gates, the output of the first being connected with the first inputs of the AND-gates of said further series circuits, and the output of the second being connected with the third inputs of the bistable multivibrators of the first series circuit, and the second inputs of said two further AND-gates being respectively connected with the two outputs of said further bistable multivibrator, means for producing a second alternating voltage and for the derivation therefrom of a second square-wave voltage of a frequency about equal to that of the first square-wave voltage, means for deriving a setting command pulse from the second square-wave voltage, and means for supplying said setting command pulse to the parallel-connected first inputs of said two further AND-gates.

References Cited by the Examiner
UNITED STATES PATENTS

| | | | |
|---|---|---|---|
| 2,530,596 | 11/1950 | Blok | 324—57 |
| 2,981,853 | 4/1961 | Meyer | 307—88.5 |
| 3,200,340 | 8/1965 | Dunne | 328—63 |
| 3,209,254 | 9/1965 | Hossmann | 324—83 |
| 3,227,949 | 1/1966 | Oberbeck | 324—57 |
| 3,247,491 | 4/1966 | DuVall | 328—63 X |

JOHN F. COUCH, *Primary Examiner.*

A. D. PELLINEN, *Assistant Examiner.*